United States Patent
Williams et al.

(10) Patent No.: US 12,449,467 B2
(45) Date of Patent: Oct. 21, 2025

(54) PULSE CATCHING

(71) Applicant: S&C Electric Company, Chicago, IL (US)

(72) Inventors: Stephen E. Williams, Caledonia, WI (US); Martin T. Bishop, Oak Creek, WI (US); Michael John Meisinger, Sr., Chicago, IL (US)

(73) Assignee: S&C Electric Company, Chicago, IL (US)

( * ) Notice: Subject to any disclaimer, the term of this patent is extended or adjusted under 35 U.S.C. 154(b) by 103 days.

(21) Appl. No.: 18/483,130

(22) Filed: Oct. 9, 2023

(65) Prior Publication Data
US 2024/0151763 A1    May 9, 2024

Related U.S. Application Data

(60) Provisional application No. 63/423,519, filed on Nov. 8, 2022.

(51) Int. Cl.
*G01R 31/08*    (2020.01)
*G01R 19/25*    (2006.01)

(52) U.S. Cl.
CPC ....... *G01R 31/086* (2013.01); *G01R 19/2513* (2013.01)

(58) Field of Classification Search
None
See application file for complete search history.

(56) References Cited

U.S. PATENT DOCUMENTS

2009/0082882 A1\* 3/2009 Parfitt .................. G05B 19/054
                                                              700/14

\* cited by examiner

*Primary Examiner* — Farhana A Hoque

(57) ABSTRACT

A device having a pulse catching function for detecting fault test pulses in an electrical power distribution network in response to a fault. The device includes one or more sensors for measuring current and/or voltage, where the device detects the pulses by loss of voltage followed by identifying one or more of a peak current magnitude of the pulses being greater than a predetermined current value, a pulse duration of the pulses being greater than a predetermined time, a predetermined interval between consecutive pulses and a presence of a pulse/inverse pulse sequence.

16 Claims, 5 Drawing Sheets

PULSE CATCHING

CROSS-REFERENCE TO RELATED APPLICATION

This application claims the benefit of priority from the U.S. Provisional Application No. 63/423,519, filed on Nov. 8, 2022, the disclosure of which is hereby expressly incorporated herein by reference for all purposes.

BACKGROUND

Field

The present disclosure relates generally to a device having a pulse catching function that identifies pulses during a pulse testing operation for detecting faults on a medium voltage distribution feeder.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that provide medium voltage to various distribution transformers and lateral connections. three-phase and single-phase lateral lines are tapped from the feeder that provide the medium voltage to various distribution transformers, where the voltage is stepped down to a low voltage and is provided to loads, such as homes, businesses, etc.

Transient faults can occur in the distribution network from things, such as animals touching the lines, lightning strikes, tree branches falling on the lines, vehicle collisions with utility poles, etc. Faults may create a short-circuit that increases the stress on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Many times the fault will be a transient or intermittent fault, where the thing that caused the fault is removed a short time after the fault occurs, for example, a lightning strike, and where the distribution network can return to normal operation after a brief disconnection from and reconnection to the source of power, whereas a persistent fault would require repairs prior to reconnection.

Fault interrupters, for example, reclosers that employ vacuum interrupters, are provided on utility poles and in underground circuits along a power line and have a switch to allow or prevent power flow downstream of the recloser. These reclosers detect the current and voltage on the line to monitor current flow and detect problems with the network circuit, such as detecting high current during a fault event. If such a high fault current is detected the recloser is opened in response thereto, and then after a short delay is closed to determine if the fault is still present. If fault current flows when the recloser is closed, it is immediately re-opened. If the fault current is detected again or two more times during subsequent opening and closing operations indicating a persistent fault, then the recloser remains open, where the time between detection tests may increase after each test. For a typical reclosing operation for fault detection tests, about three or more cycles of fault current pass through the recloser before it is opened.

When a fault is detected, it is desirable that the first fault interrupter upstream from the fault be opened as soon as possible so that the fault is quickly removed from the network so that the loads upstream of that fault interrupter are not disconnected from the power source and service is not interrupted to them. It is further desirable that if the first fault interrupter upstream from the fault does not open for whatever reason, then a next fault interrupter upstream from the fault is opened, and so on. In order to accomplish this, it is necessary that some type of communications or coordination protection scheme be employed in the network so that the desired fault interrupter is opened in response to the fault.

During the traditional reclosing operation discussed above, the vacuum interrupter contacts in the recloser are closed irrespective of the closing angle. This results in a random closing angle that often creates an asymmetrical fault current, where the current cycle is offset from zero, i.e., has high magnitude peaks and relatively shallow valleys relative to zero. The high magnitude fault current peaks, depending on the length of time they are occurring, cause significant forces and stresses on the components in the network that may reduce their life. For the traditional reclosing operation having current flow duration over three or more cycles, these forces and stresses can be considerable.

In order to overcome this problem, reclosers have been developed in the art that use pulse testing technologies where the closing and then opening of the vacuum interrupter contacts is performed in a manner so that the full fundamental frequency fault current is not applied to the network while the recloser is testing to determine if the fault is still present, where typically these pulses are one cycle of a fundamental frequency current cycle or less. Additionally, these devices close their contacts at a point in time to eliminate the offset current, which reduces the stresses due to high current in the system components.

A sectionalizer is a self-contained, circuit-opening device used in combination with source-side protective devices, such as reclosers or circuit breakers, to automatically isolate faulted sections of an electrical distribution network. The device is typically distributed between and among the reclosers to provide a system for isolating smaller sections of the network in response to a fault. Sectionalizers rely on observing a sequence of fault currents and the presence and absence of voltage either to indicate the presence of a fault or count the number of reclosing attempts. Sectionalizers then perform circuit isolation by opening their switching device when the predetermined number of reclosing attempts has been reached. Existing power distribution circuit sectionalizers detect the passage of fault currents, including both the initial fault event and subsequent recloser-initiated events, as part of more elaborate fault isolation and restoration processes. These processes may include counting discrete intervals of fault current passage, or counting discrete intervals of voltage presence and absence.

A faulted circuit indicator is a device that automatically detects and identifies faults in an electrical distribution network, but does not have switching capabilities to open a power line. Faulted circuit indicators rely on observing a sequence of fault currents and the presence and absence of voltage either to indicate the presence of a fault or count the number of reclosing attempts. Faulted circuit indicators may be used in manual fault isolation processes and may be used in automatic fault isolation processes if they are included as part of more elaborate fault isolation and restoration processes.

The pulse testing technologies mentioned above use pulses that are less than one fundamental frequency current cycle, so that the full fault current is not applied to the network for many cycles while the recloser is testing to determine if the fault is still present. With the introduction of these testing technologies, the methods of counting fault current passage events used by conventional sectionalizers and fault indicators are no longer sufficient to detect the operation of a circuit test event because the amount of current is too low and/or it is not flowing in the circuit for a significant duration. More specifically, by design this type of pulse testing does not allow sufficient current to flow in a faulted circuit for a long enough duration to activate conventional faulted circuit indicators and sectionalizing devices.

SUMMARY

The present disclosure describes a device having a pulse catching function that is part of a pulse detection system for detecting pulses in an electrical power distribution network in response to a fault. The system includes a feeder, a power source providing power to the feeder and a recloser electrically coupled to the feeder and including an interrupter switch and one or more sensors for measuring current and/or voltage on the feeder, where the recloser detects fault current and is operable to clear the fault and then perform a pulse testing process that generates the pulses to determine if the fault continues to be present. The pulse catching function that is applied in devices electrically coupled along the feeder and includes one or more sensors for measuring current and/or voltage on the feeder, where the pulse catching function in the device detects the pulses produced by the pulse testing process by identifying one or more of a peak current magnitude of the pulses being greater than a predetermined current value, a pulse duration of the pulses being greater than a predetermined time, a predetermined interval between consecutive pulses and a presence of a pulse/ inverse pulse sequence.

Additional features of the present disclosure will become apparent from the following description and appended claims, taken in conjunction with the accompanying drawings.

DETAILED DESCRIPTION OF THE EMBODIMENTS

Figure 1:
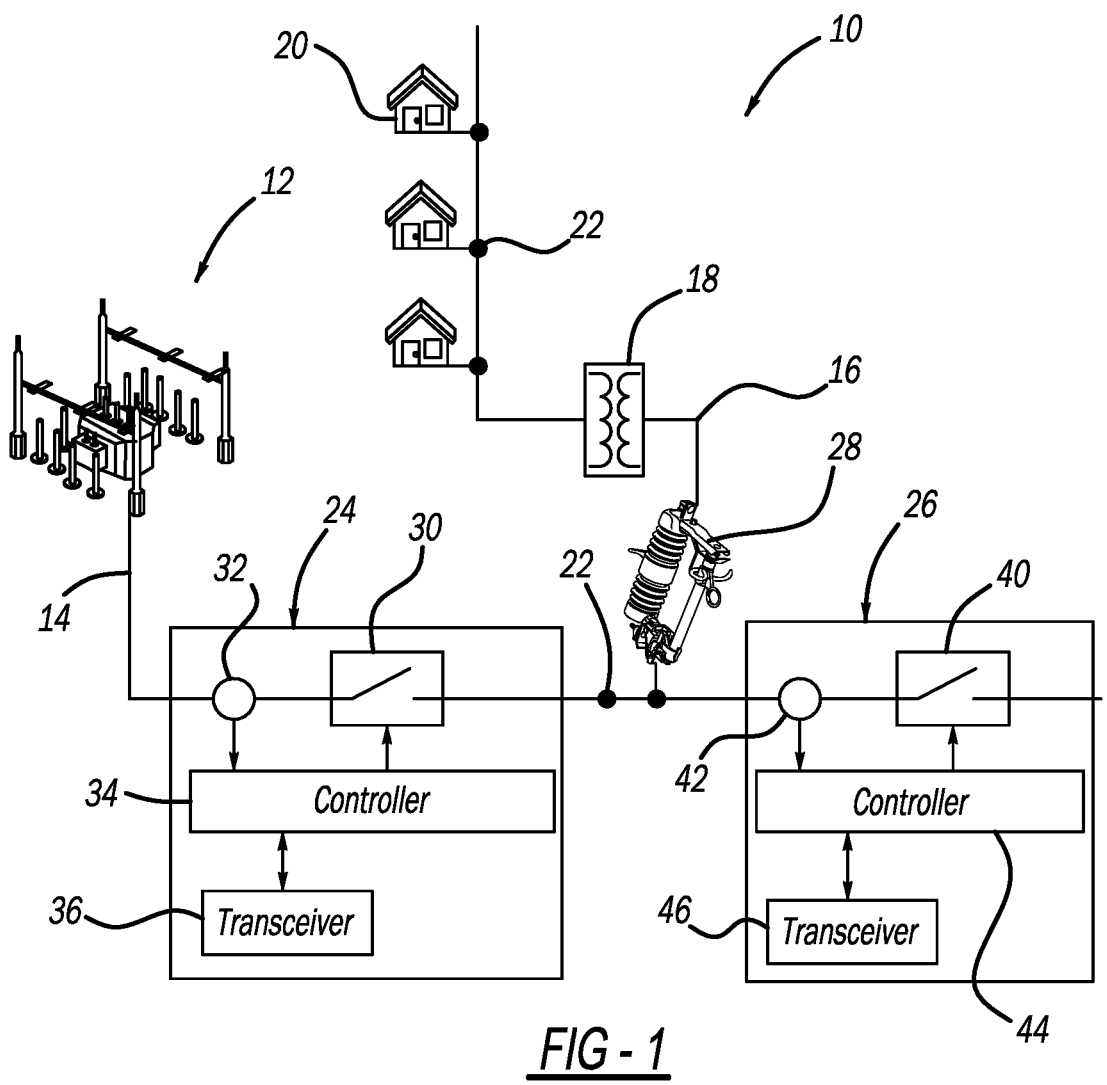
FIG. 1 is a simplified schematic illustration of an electrical power distribution network including a device having an enabled pulse catching function.

The following discussion of the embodiments of the disclosure directed to a device having a pulse catching function for detecting pulses during pulse testing is merely exemplary in nature and is in no way intended to limit the disclosure or its applications or uses.

In a normal unfaulted power distribution network, the characteristics of the circuit as observed using phase current and phase voltage are mostly resistive, where a pulse will result in voltage and current that are close to in phase. When the circuit is faulted, the characteristics of the circuit as observed using phase current and phase voltage are much more inductive, where the pulse generated has a phase shift between the current and the voltage. Thus, a pulse can be identified during fault pulse testing by loss of voltage followed by the initiation or reoccurrence of voltage and/or current that lasts for a certain duration followed by another time interval and another pulse.

Based on this understanding, this disclosure proposes a pulse catching function that can be implemented in a device that has control logic for circuit sensing and signal processing that utilizes unique characteristics of the known pulse testing technologies to detect the occurrence of a pulse test sequence, and discriminate that pulse test sequence from other transients found on the network when it is operating normally. One objective of the device having the pulse catching function is to correctly identify the presence of current and/or voltage that results from fault pulse testing in the network. In addition to detecting the pulse transients of interest, the device 26 must not produce false positive decisions for other transients commonly observed on distribution circuits. The device having the pulse catching function can be incorporated as part of a switching device including control logic that provides overall fault location, isolation, sectionalizing, and/or restoration (FLISR) that maximizes the inherent advantages of pulse testing as compared to conventional circuit recloser operation.

Pulse tests on non-faulted circuits are expected to produce consistently lower peak pulse currents than a pulse test on a faulted circuit. However, there is significant overlap between the upper range of non-fault currents and the lower range of fault currents. A downstream observer device with a relatively higher fault discrimination threshold would likely correctly identify most of the fault pulses if the fault location was downstream of the observer device, while missing some of the relatively lower current fault pulses. By comparison, an observer device with a relatively lower fault discrimination threshold would likely incorrectly identify higher current non-fault pulses. Thus, discrimination based only on pulse peak current values would yield unacceptable false-positive results when using a lower threshold, and false-negative results when using a higher threshold.

The peak current statistics generally support the application of devices with pulse sensing capabilities such that if the observer device is between the recloser and the fault location, and it can measure short-duration pulse events, even with low accuracy, the basic faulted circuit indication function can be achieved using pulse test sensing. However, if the circuit is not faulted, or the fault is upstream of the observer device, then current measurement alone would not be sufficient to recognize pulses. The probability of an accurate identification of pulse sequences can be significantly improved when the various timing aspects of the pulses are considered.

The interval between fault interruption and pulse initiation on one of the faulted phases is a user-configurable setting within pulse testing devices. This initial open interval may range from several current cycles to seconds, though once configured in the recloser it is consistent. Note that a pulse sequence on a faulted circuit will always contain both the pulse and an inverse-pulse. The interval between the pulse and the inverse pulse on a particular phase is typically 4-5 current cycles, with slight variation within the range for the point-on-wave targeted by the recloser. A non-fault pulse sequence may include a pulse and inverse-pulse, where the inverse-pulse is applied to discriminate between a faulted circuit and a non-fault inrush condition on the initial pulse. Upon completion of a non-fault pulse sequence on a phase, the recloser closes the corresponding phase after a predetermined duration of approximately four current cycles.

The interval between the end of a pulse/inverse-pulse/voltage return sequence on one phase and the initiation of a pulse sequence on the next phase is approximately four current cycles. This value is configurable, but consistent with the configured value. The interval between the initial pulse on one phase to the initial pulse on the next phase, under non-fault conditions, is approximately nine current cycles. When inverse-pulses are required, this interval increases to approximately thirteen current cycles. The traces are captured by a downstream recloser. The upstream recloser pulses and closes each of the non-faulted phases, followed by the downstream recloser pulsing on a faulted circuit and remaining open.

Capacitor energization is characterized by a single super-synchronous oscillatory transient current. For three-phase banks without point-on-wave closing control, the transients can be expected to occur on all three phases simultaneously within a few milliseconds according to switch pole span. For capacitor banks with point-on-wave closing control, the expected pole span is 0.5 to 2 current cycles. These transients can be distinguished from pulse events by the deliberate pulse/inverse-pulse sequence (also including the timing between pulses) for high current transients, and the extended pole span of the pulse-testing recloser.

Expulsion fuses and weak-link fuses are both zero-waiting devices (current interrupts at a zero crossing) that can be characterized as either a single loop of high current or multiple cycles of current. If current sensing alone, without voltage sensing, is utilized in the device having the pulse catching function, the extended duration of a fuse event, or the lack of an inverse-pulse, can be used to discriminate the fuse event from recloser pulsing. If voltage sensing is incorporated in the device having the pulse catching function, a fuse operation downstream of the device would result in continued voltage presence, thereby identifying the event as not originating from e recloser pulse sequence.

Current limiting (CL) fuses in their non-limiting operating region are zero-waiting devices like expulsion and weak-link fuses. In their current limiting region, current pulse duration ranges from less than 0.25 milliseconds (ms) to not more than 4 ms. Based on the recloser pulse duration statistics, and the lack of an inverse-pulse during a high-current event, CL fuse operations are readily distinguished from recloser pulses.

Arcing faults and downed conductors on medium voltage overhead distribution circuits are characterized by low currents and erratic repetitive conduction. While individual cycles of arcing observed without awareness of the recloser pulse sequence may be mistaken for a pulse, the deterministic intervals of recloser pulse-testing allow successful discrimination.

FIG. 1 is a schematic type diagram of an electrical power distribution network 10 including an electrical substation 12 that steps down high voltage power from a high voltage power line (not shown) to medium voltage power, a three-phase feeder 14 that receives power at medium voltage from the substation 12, and a lateral line 16 that receives the medium voltage power from the feeder 14. The power provided at medium voltage is stepped down to a low voltage by distribution transformers 18 strategically positioned along the lateral line 16, and the low voltage is then provided to loads 20 represented here as homes. The lateral line 16 includes a fuse 28 positioned between the feeder 14 and the first load 20 on the lateral line 16 proximate to a tap location where the lateral line 16 is connected to the feeder 14. The fuse 28 is an independent electrical device that is not in communication with other components or devices in the network 10, where the fuse 28 creates an open circuit if an element within the fuse 28 heats up above a predetermined temperature as a result of high fault current so as to prevent short-circuit faults on the lateral line 16 from affecting other parts of the network 10.

The network 10 includes reclosers of the type referred to above provided at certain intervals along the feeder 14, represented by a recloser 24, that receive the medium voltage signal from the substation 12 on the feeder 14. Although only shown as a single line, the feeder 14 would include three conductors, one for each phase, where a separate recloser would be provided with interrupters for each of the three phases. Utility poles 22 are provided along the feeder 14 and the lateral line 16, where the recloser 24 would be mounted on a certain one of the poles 22. The recloser 24 includes a vacuum interrupter switch or other type of switching device 30 for opening and closing the recloser 24 to allow or prevent current flow therethrough on the feeder 14, where the recloser 24 is capable of providing pulses for pulse testing consistent with the discussion herein. The recloser 24 also includes sensors 32 for measuring the current and voltage of the power signal propagating on the feeder 14, a controller 34 for processing the measurement signals and controlling the position of the switch 30, and a transceiver 36 for transmitting data and messages to a control facility and/or to other reclosers and components in the network 10.

The network 10 also includes a device 26 having a pulse catching function of the type discussed above that is capable of distinguishing pulses during pulse testing by the recloser 24 to detect a fault. The device 26 can be embodied in any suitable component, such as a sectionalizer, faulted circuit indicator, etc. In this regard, the device 26 may include a switch 40, voltage/current sensors 42, a controller 44 and a transceiver 46.

Figure 2:
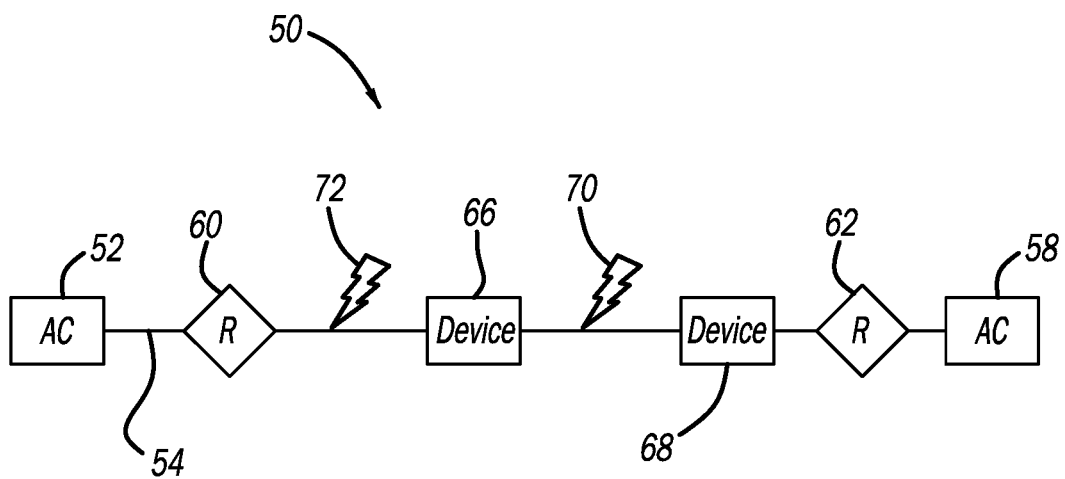
FIG. 2 is a simplified schematic illustration of an electrical power distribution network including devices that have a pulse catching function.

FIG. 2 is a simplified schematic type diagram of an electrical power distribution network 50 that may help provide context for the discussion herein. The network 50 includes an AC power source 52, such as an electrical substation that steps down power at high voltage from a high voltage power line (not shown) to a medium voltage power line, at one end of a three-phase feeder 54 and an AC power source 58 at an opposite end of the feeder 54. The network 50 also includes a normally closed recloser 60 adjacent to the source 52 at one end of the feeder 54 and a normally open recloser 62 adjacent to the source 58 at an opposite end of the feeder 54 from the recloser 60. Devices 66 and 68 having a pulse catching function are provided along the feeder 54 between the reclosers 60 and 62. The reclosers 60 and 62 and the devices 66 and 68 would all likely be mounted on utility poles, where the span length between adjacent reclosers is typically miles. A fault 70 is depicted downstream of the device 66 and a fault 72 is depicted between the recloser 60 and the device 66 that are used for the discussion below. During normal operation, the recloser 60 is closed and the recloser 62 is open so that the loads along the feeder 54 are serviced by the source 52. The discussion below defines upstream and downstream for this configuration. If the switches in the devices 66 and 68 are opened in response to detecting the fault 70, then the recloser 62 can be closed to service the loads between the device 68 and the recloser 62 from the source 58.

Determining the simple presence or absence of current and/or voltage through direct measurement is not sufficient to uniquely identify the occurrence of a pulse test. Correct identification of a pulse test requires more elaborate classification of transient characteristics, such as duration, correlation of current to voltage, repetition and timing between discrete events. Since the device 26 is independent of the recloser 24, an explicit assumption of this feasibility analysis is that the device 26 is not required to perform the fault/no-fault line health assessment as is done by the recloser. Furthermore, it is assumed that the device 26 is not capable of assessing the fault/no-fault line health assessment in the same manner as the recloser 24 initiating the pulse.

Downstream recloser pulsing may be difficult to discriminate if the device 26 is using only current sensing and there is minimal load between the device 26 and a downstream recloser. If the device 26 is fitted with voltage sensing, the current pulses can be readily identified as initiated by the downstream recloser, due to the steady state voltage presence or absence at the device 26 prior to and after the observed current pulses.

Determining the direction of current flow in the device 26, or determining fault location relative to the device 26, either upstream or downstream, may be required by the overall circuit automation scheme. The techniques identified here apply to discriminating if the device 26 is located between the recloser 24 and the fault, i.e., the device 26 is upstream of the fault, or if the fault is located between the recloser 24 and the device 26, i.e., the device 26 is downstream of the fault. These methods do not attempt to identify fault type or circuit distance to the fault.

When the device 26 is positioned between the recloser 24 and the fault, i.e., the device 26 is upstream of the fault, the device 26 observes the fault current and downstream load current. In this situation, pulse identification can be accomplished by observing the following characteristics: peak current magnitude greater than approximately 400 amps; pulse duration greater than 5 ms; pulse-to-pulse interval of approximately four current cycles depending on recloser configuration; and the presence of the pulse/inverse pulse sequence. To a lesser extent, the fault clearing-to-pulse initiation interval may be considered, along with the phase-to-phase pulse interval. If voltage sensing is included, the instantaneous MVA (apparent power) and active power can be used to develop a higher confidence in the directional determination.

Figure 3:
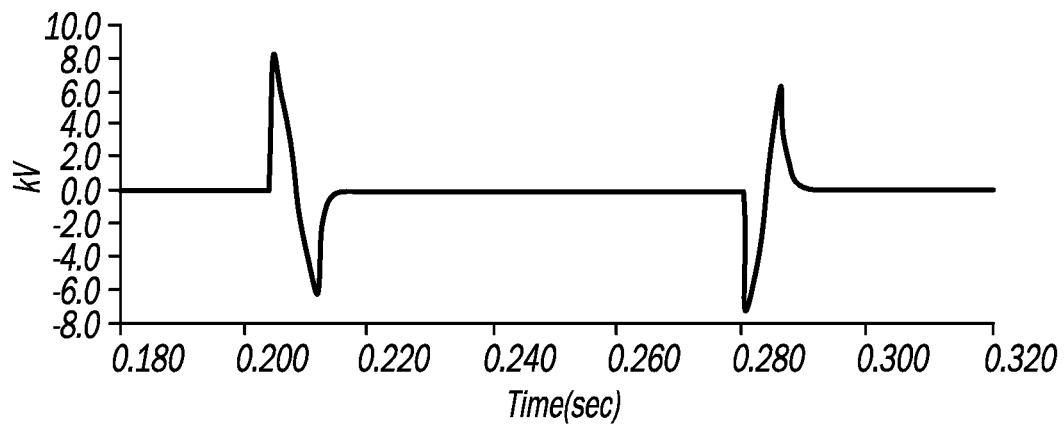
FIG. 3 is a graph with time on the horizontal axis and MVA on the vertical axis showing voltage transitions over time during pulse testing when the device having the pulse catching function is upstream of the fault.
Figure 4:
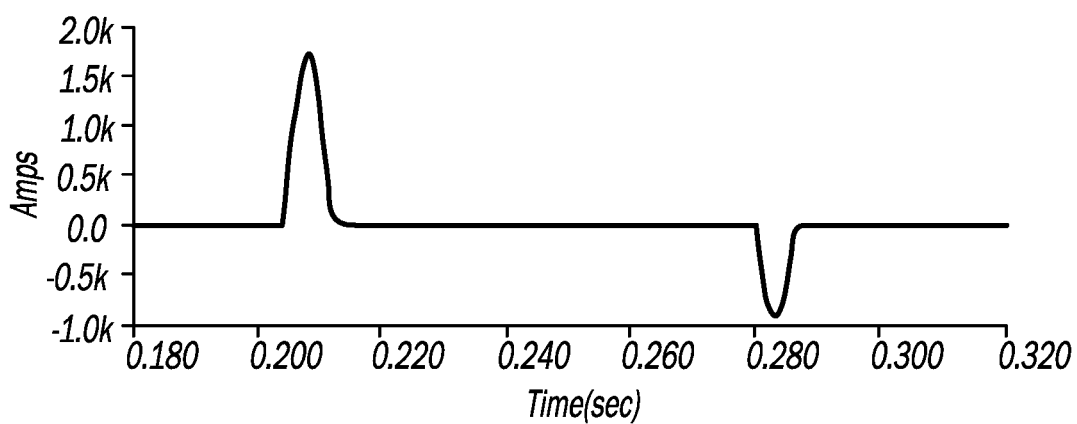
FIG. 4 is a graph with time on the horizontal axis and current on the vertical axis showing current transitions over time during pulse testing when the device having the pulse catching function is upstream of the fault.
Figure 5:
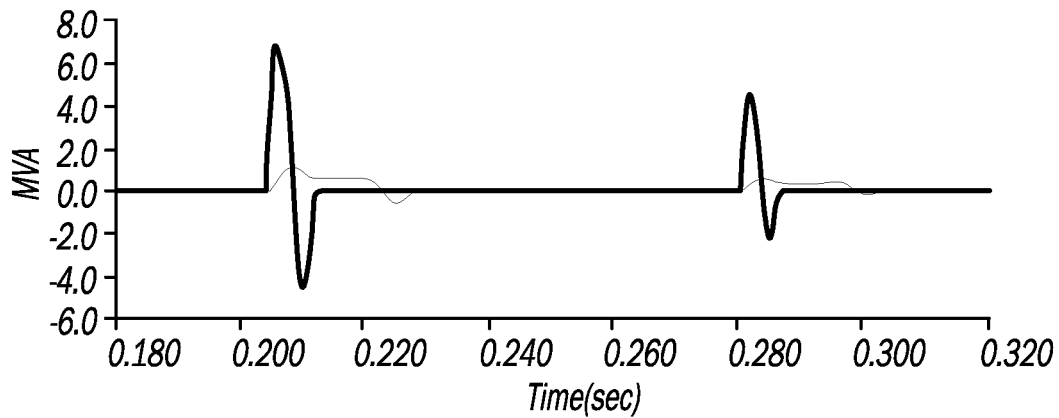
FIG. 5 is a graph with time on the horizontal axis and MVA on the vertical axis showing apparent power transitions over time during pulse testing when the device having the pulse catching function is upstream of the fault.

FIGS. 3-5 are graphs with time on the horizontal axis and, respectively, voltage, current and MVA on the vertical axis for an example simulation of a 1200 A (rms) phase-to-ground fault on a solidly grounded 12.47 kV circuit when the device 26 is between the recloser 24 and the fault, i.e., downstream of the device 26, where FIG. 3 shows an instantaneous phase-to-ground voltage, FIG. 4 shows a phase current and FIG. 5 shows apparent power. Plotted with instantaneous apparent power is the one-cycle average power. Note the bipolar nature of the instantaneous power, and the large ratio of peak instantaneous power to average power.

The graphs in FIGS. 3-5 show what is observed by the device 26 during two consecutive pulses for fault detection. FIG. 3 shows a voltage pulse that rises and then quickly goes to zero, and then goes negative. At the same time, FIG. 4 shows the current rises fairly high, and then returns to zero over about 5 milliseconds. Then, about 60 millisecond later, the voltage goes negative, returns to zero and then goes positive. At the same time, the current goes negative. Although, the pulses are shown in the positive and then negative direction in this example, at other times the pulses will first be negative and then positive. Therefore, by looking at the transition between no voltage and then a brief pulse of voltage going both positive and negative, and at the same time seeing such a transition in current, followed by a predefined interval of no voltage or current, and then a voltage pulse in the opposite direction with a corresponding current pulse the pulse testing can be detected. If more than one phase is faulted, then the same transitions of voltage and current would occur sometime later. Thus, it is the duration of the pulses, the polarity of the pulses and the time between the pulses that identifies the pulse testing. The pulse catching enabled device does not need to detect the original fault current. Instantaneous power (MVA) and one-cycle average power can be used to determine relative direction to the source.

Figure 6:
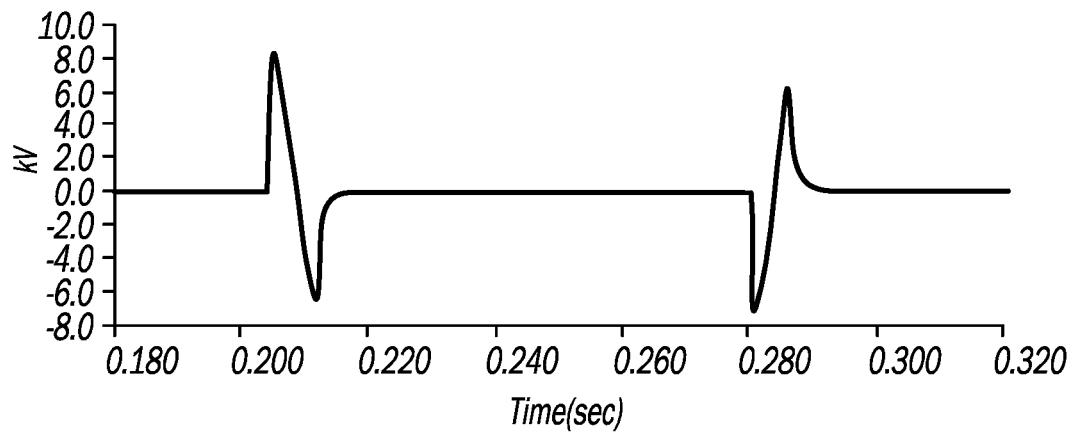
FIG. 6 is a graph with time on the horizontal axis and MVA on the vertical axis showing voltage transitions over time during pulse testing when the device having the pulse catching function is downstream of the fault.
Figure 7:
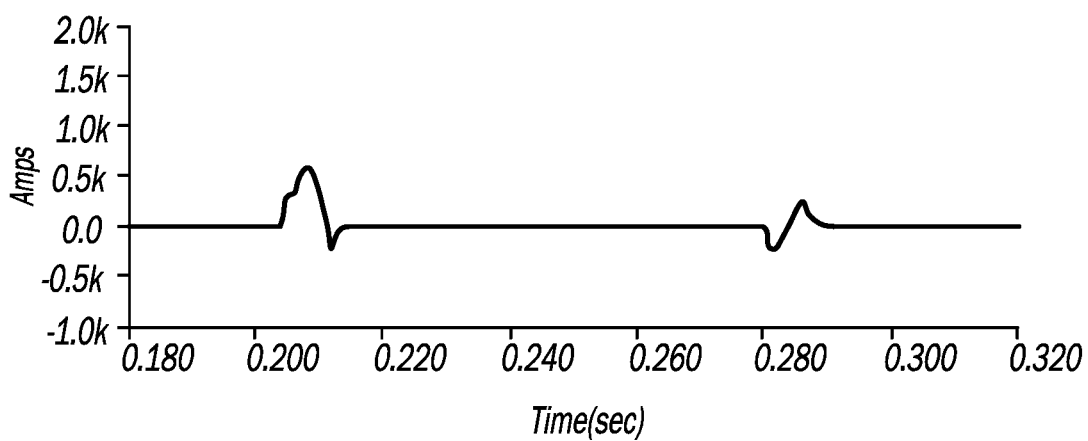
FIG. 7 is a graph with time on the horizontal axis and current on the vertical axis showing current transitions over time during pulse testing when the device having the pulse catching function is downstream of the fault.
Figure 8:
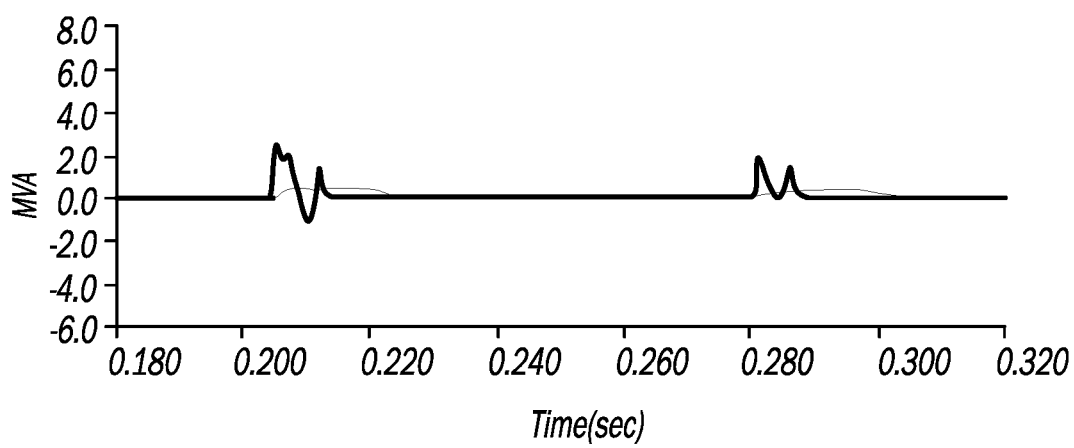
FIG. 8 is a graph with time on the horizontal axis and MVA on the vertical axis showing apparent power transitions over time during pulse testing when the device having the pulse catching function is downstream of the fault.

If the fault is positioned between the recloser 24 and the device 26, the device 26 observes only the downstream load current. FIGS. 6-8 are graphs with time on the horizontal axis and, respectively, voltage, current and MVA on the vertical axis for the example simulation when the device 26 is downstream from the fault, where FIG. 6 shows an instantaneous phase-to-ground voltage, FIG. 7 shows a phase current and FIG. 8 shows apparent power. The measured current has a notably lower peak magnitude, though current alone is not sufficient to identify this event as a pulse testing sequence resulting from an upstream fault. The unique indicator for this discrimination is the unipolar instantaneous apparent power of the pulse and/or inverse pulse. The instantaneous apparent power of the initial pulse presents a bipolar signature, which is caused by a transformer inrush component of the measured current. If remanent flux in the load transformers was negligible, both pulses would exhibit unipolar instantaneous apparent power.

If downstream load current is very low or non-existent, pulse sequences may not be reliably detected, where the device 26 would observe the pulse/inverse-pulse sequence in voltage, but only a single current pulse with bipolar instantaneous apparent power, with the observed current pulse due to transformer inrush. With decreasing fault impedance, corresponding to increasing upstream fault currents, the device 26 would observe smaller voltage pulses and less transformer inrush current. Ultimately, for bolted faults, there would be no voltage or current for the device 26 to observe. In this situation, the device 26 may not detect the existence of the upstream fault, but it would not produce a "false positive" detection of a pulse, since the complete pulse/inverse-pulse current sequence is not observed.

Under many circumstances, the device 26 may be sourced from either direction, where it would be useful for the device 26 to be able to identify its relative source direction. This feature is not required for the device 26 to discriminate its position relative to the source and fault, which is based on the bipolar or unipolar instantaneous apparent power. Using a one-cycle sliding window average power, the source direction determination can be accomplished based on the polarity of the average power signal over each pulse or inverse-pulse event.

Figure 9:
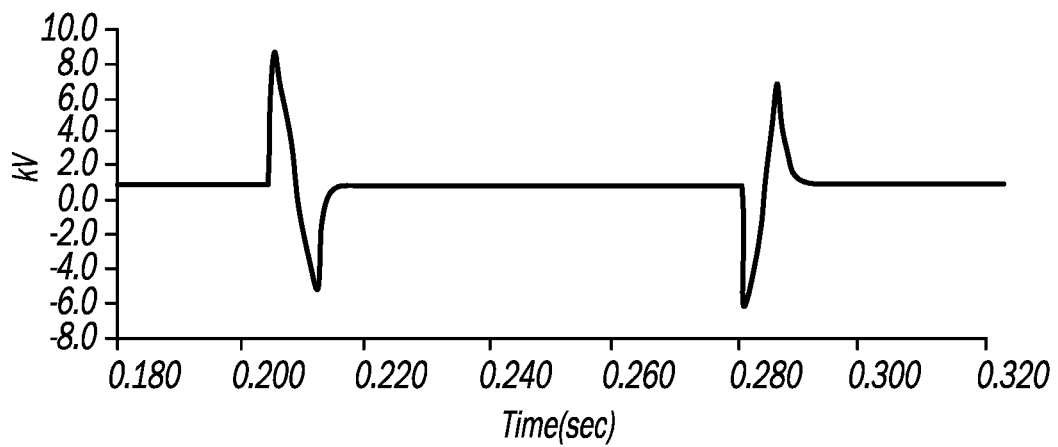
FIG. 9 is a graph with time on the horizontal axis and MVA on the vertical axis showing voltage transitions over time during pulse testing when the source is in a reverse direction and the device having the pulse catching function is between the recloser and the fault.
Figure 10:
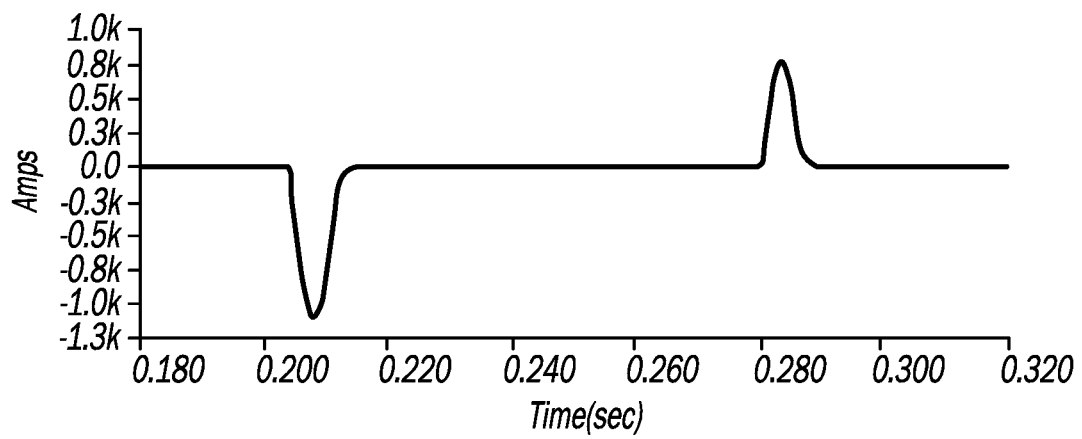
FIG. 10 is a graph with time on the horizontal axis and current on the vertical axis showing current transitions over time during pulse testing when the source is in a reverse direction and the device having the pulse catching function is between the recloser and the fault.
Figure 11:
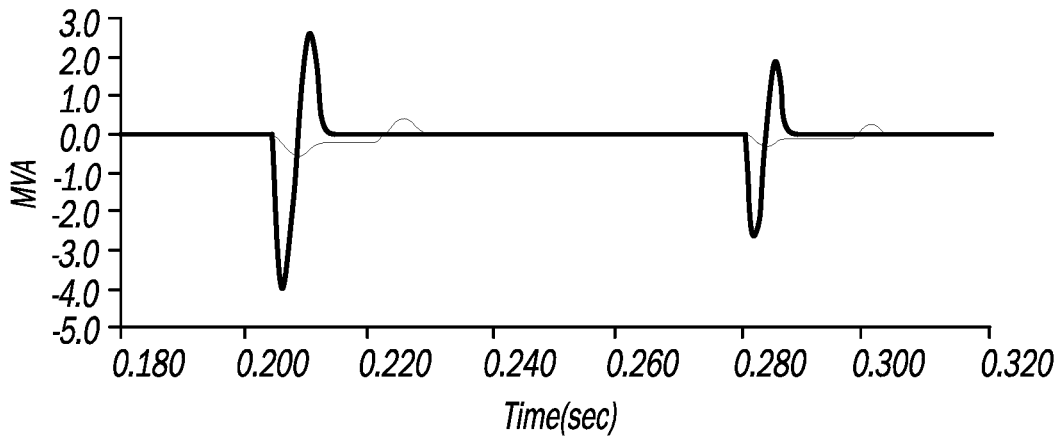
FIG. 11 is a graph with time on the horizontal axis and MVA on the vertical axis showing apparent power transitions over time during pulse testing when the source is in a reverse direction and the device having the pulse catching function is between the recloser and the fault.
Figure 12:
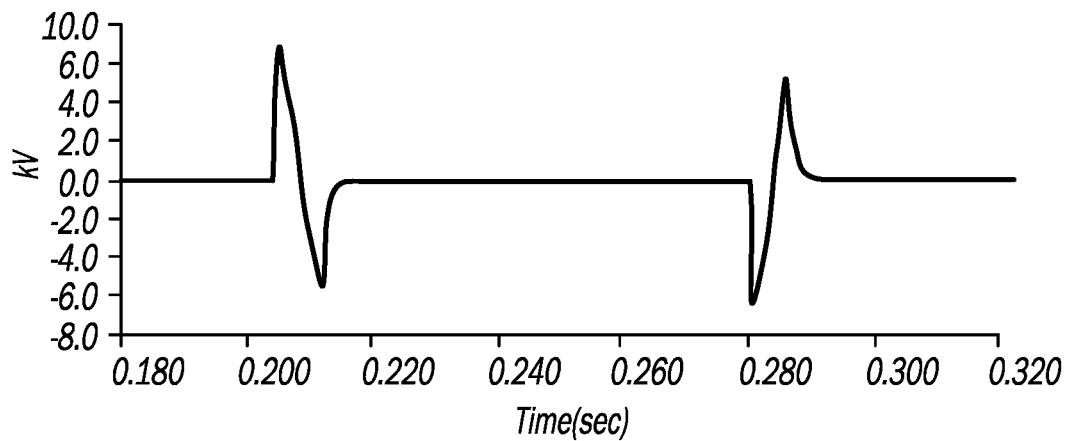
FIG. 12 is a graph with time on the horizontal axis and MVA on the vertical axis showing voltage transitions over time during pulse testing when the source is in a reverse direction and the device having the pulse catching function is between the recloser and the fault.
Figure 13:
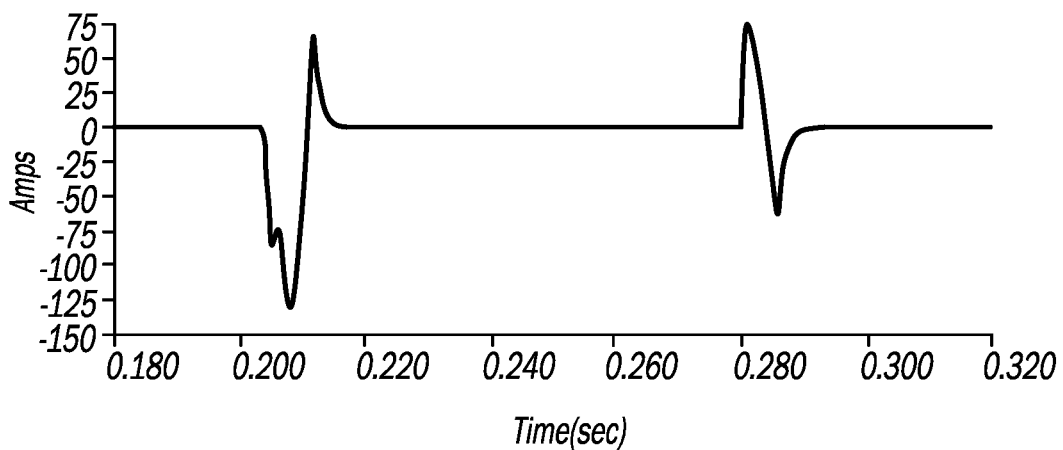
FIG. 13 is a graph with time on the horizontal axis and current on the vertical axis showing current transitions over time during pulse testing when the source is in a reverse direction and the device having the pulse catching function is between the recloser and the fault.
Figure 14:
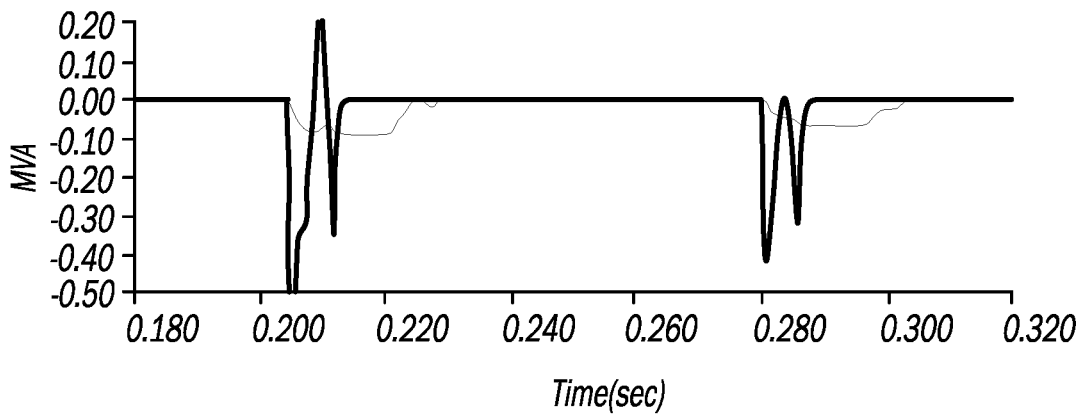
FIG. 14 is a graph with time on the horizontal axis and MVA on the vertical axis showing apparent power transitions over time during pulse testing when the source is in a reverse direction and the device having the pulse catching function is between the recloser and the fault.

FIGS. 9-11 are graphs with time on the horizontal axis and, respectively, voltage, current and MVA on the vertical axis for the example simulation when the device 26 with the fault current source in the 'reverse' direction and the device 26 located between the recloser 24 and the fault, and FIGS. 12-14 are graphs with time on the horizontal axis and, respectively, voltage, current and MVA on the vertical axis for the example simulation with the fault current source in the 'reverse' direction and the fault located between the recloser 24 and the device 26.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A pulse detection system for detecting pulses in an electrical power distribution network in response to a fault, the system comprising:
   a feeder;
   a power source providing power to the feeder;
   a recloser electrically coupled to the feeder and including an interrupter switch and one or more sensors for measuring current and/or voltage on the feeder, wherein the recloser detects fault current and is operable to clear the fault and then perform a pulse testing process that generates the pulses to determine if the fault continues to be present; and
   a device having a pulse catching function electrically coupled along the feeder, the device including one or more sensors for measuring current and/or voltage on the feeder, wherein the device detects the pulses produced by the pulse testing process by identifying one or more of a peak current magnitude of the pulses being greater than a predetermined current value, a pulse duration of the pulses being greater than a predetermined time, a predetermined interval between consecutive pulses and a presence of a pulse/inverse pulse sequence.

2. The system according to claim 1 wherein the device only uses current measurements to detect the pulses.

3. The system according to claim 1 wherein the device uses both current and voltage measurements to detect the pulses.

4. The system according to claim 1 wherein the predetermined current value is 400 amps, the predetermined time is 5 milliseconds (ms) and the predetermined pulse-to-pulse interval is 4 current cycles.

5. The system according to claim 1 wherein the device senses a transition between no voltage and then a brief pulse of voltage going both positive and negative and a transition between no current and then a brief pulse of current going both positive and negative, followed by a predefined interval of no voltage or current, and then a voltage pulse in the opposite direction with a corresponding current pulse to detect the pulses.

6. The system according to claim 5 wherein the recloser is downstream of the source, the device is downstream of the recloser and the fault is downstream of the device.

7. The system according to claim 1 wherein the device also uses apparent power to detect the pulses.

8. The system according to claim 7 wherein the recloser is downstream of the source, the fault is downstream of the recloser and the device is downstream of the fault.

9. The system according to claim 1 wherein the device determines a direction of the source relative to the device.

10. The system according to claim 9 wherein the device uses a polarity of average power over each detected pulse or inverse pulse to determine the direction of the source.

11. The system according to claim 1 wherein the device is part of a sectionalizer or faulted circuit indicator.

12. A pulse detection system for detecting pulses in an electrical power distribution network in response to a fault, the system comprising:
   a feeder;
   a power source providing power to the feeder;
   a recloser electrically coupled to the feeder and including an interrupter switch and one or more sensors for measuring current and/or voltage on the feeder, wherein the recloser detects fault current and is operable to clear the fault and then perform a pulse testing process that generates the pulses to determine if the fault is still present; and a device having a pulse catching function electrically coupled along the feeder, the device including one or more sensors for measuring current and/or voltage on the feeder, wherein the device detects the pulses produced by the pulse testing process by loss of voltage followed by an initiation or reoccurrence of voltage at a predetermined point on a current wave that lasts for a predetermined duration followed by another time interval and another pulse.

13. The system according to claim 12 wherein the device senses a transition between no voltage and then a brief pulse of voltage going both positive and negative and a transition between no current and then a brief pulse of current going both positive and negative, followed by a predefined interval of no voltage or current, and then a voltage pulse in the opposite direction with a corresponding current pulse to detect the pulses.

14. The system according to claim 13 wherein the recloser is downstream of the source, the device is downstream of the recloser and the fault is downstream of the device.

15. The system according to claim 12 wherein the device also uses apparent power to detect the pulses.

16. The system according to claim 15 wherein the recloser is downstream of the source, the fault is downstream of the recloser and the device is downstream of the fault.

* * * * *